B. J. LONG.
CHAIN HOOK.
APPLICATION FILED APR. 26, 1921.

1,392,184.

Patented Sept. 27, 1921.

Bertie J. Long
INVENTOR

BY Victor J. Evans
ATTORNEY

UNITED STATES PATENT OFFICE.

BERTIE J. LONG, OF WEST BROOKLYN, ILLINOIS.

CHAIN-HOOK.

1,392,184.  Specification of Letters Patent.  Patented Sept. 27, 1921.

Application filed April 26, 1921. Serial No. 464,652.

*To all whom it may concern:*

Be it known that I, BERTIE J. LONG, a citizen of the United States, residing at West Brooklyn, in the county of Lee and State of Illinois, have invented new and useful Improvements in Chain-Hooks, of which the following is a specification.

The object of my present invention is the provision of a hook adapted to be used on a tire chain, and one characterized by simplicity and cheapness, by the facility with which it may be manipulated to connect it to and disconnect it from a chain link, and capacity to effectively prevent casual release and loss of a chain.

To the attainment of the foregoing, the invention consists in the improvement as hereinafter described and definitely claimed.

In the accompanying drawings, forming part of this specification:—

Similar numerals of reference designate correspondnig parts in all of the views of the drawings.

Figure 1:
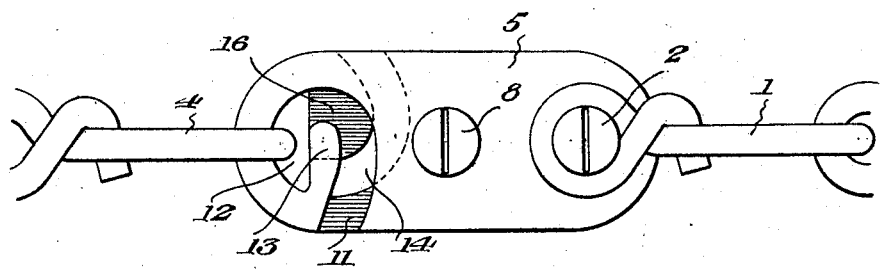
Figure 1 is a side elevation showing my novel hook as permanently joined to one end of a tire chain and as coupled to the link at the opposite end of said chain.
Figure 2:
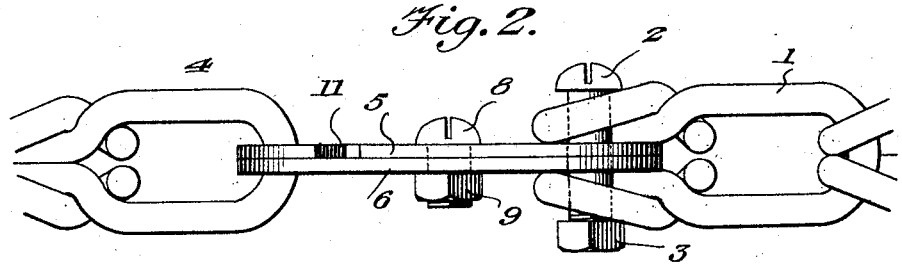
Fig. 2 is a view showing the hook in plan—*i. e.*, the edge of the hook, and also showing the bolt and nut through the medium of which the hook sections may be locked in closed position.
Figure 3:
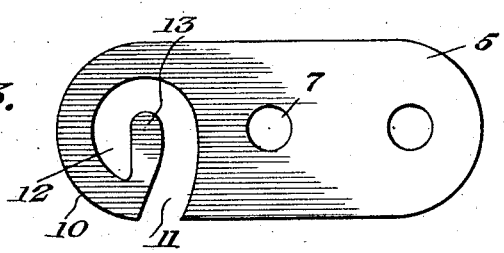
Figs. 3 and 4 are detail views of the members of the hook.
Figure 4:
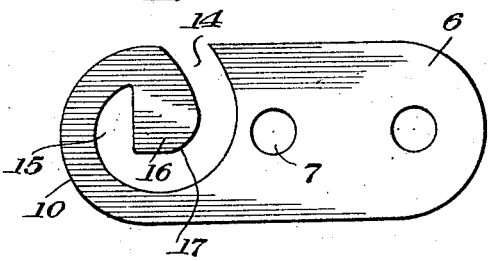

My novel hook is designed to be permanently connected in pivotal manner to one end link 1 of a tire chain through the medium of a bolt 2 and nut 3; and it is adapted to be engaged as hereinafter described with the opposite end link 4 of the chain. The hook is made up of two side by side members 5 and 6, the said members 5 and 6 being pivotally connected together by the bolt 2 and being of corresponding outline so that when the hook is closed it will present the appearance in side elevation of a single body. Each of the members 5 and 6 is provided with a transverse aperture 7, and when the hook is closed and the said apertures 7 are registered, a bolt 8 equipped with a nut 9 may be employed in the aperture 7 with a view to locking the members 5 and 6 in closed relation, and thereby precluding the possibility of the link being casually open.

The forward end of each member 5 and 6 is rounded so as to describe an arc of a circle as indicated by 10. It will also be noticed that the member 5 is provided with a slot 11 which reaches in curved manner from the lower edge of the member 5 to a seating point 12 within a tongue 13 that extends upwardly and forms an integral part of the member 5. The member 6 is provided with a slot 14 that reaches in curved manner from the upper edge of the member 6 and extends to a seating point 15 forwardly of a pendent tongue 16 that forms an integral part of the member 6. It will also be noticed that the tongue 16 is wider than the tongue 13 in about the proportion illustrated, and that the said tongue 16 has its end 17 rounded so that the end link 4 will be guided thereby over the end of the tongue 13 when said end link is secured in the hook. It will also be noticed that the inner edges of the bill portions of both members 5 and 6 describe arcs of circles with the result that the hook opening is located close to the forward end of the hook which renders it easy to engage the chain link 4 with the hook and also renders it easy to disengage the said link 4 subsequently to proper manipulation of the hook members 5 and 6. It will further be apparent that the comparatively wide tongue 16 contributes to the strength of the hook and also contributes to lessening the liability of the hook being accidentally disengaged from the link 4.

In the practical use of my noved hook when it is desired to disconnect the hook from the link 4 it is simply necessary to swing the members 5 and 6 in opposite directions on the bolt 2 until the bight of the slot in the member 6 is above the tongue 13 of the member 5. The end bight of the end link 4 is then moved into the outer portion of the slot 11 in the member 5 and then by swinging the forward portions of the members 5 and 6 in opposite directions the mouth of the bolt 14 will be arranged clear of the member 5 whereupon the link may be withdrawn from the said slot 14. To engage the end link 4 with the hook the operation described is reversed whereupon the link will be secured with its bight in the bill portions of the side by side members 5 and 6.

It will be apparent from the foregoing that my novel hook is adapted to be stamped or otherwise cheaply produced of appropriate metal.

Having described my invention, what I claim and desire to secure by Letters Patent is:—

A hook for the purpose described comprising side by side members corresponding in outline and having forward ends that describe an arc of a circle; one of the said members having in its forward portion a curvilinear slot that reaches upwardly from its lower edge and then downwardly and also having an upstanding tongue between said slot portions, and the other member having a slot in its forward portion that reaches downwardly from its upper edge and then upwardly, and also having a comparatively wide pendent tongue between said slot portions, and the forward walls of the forward slot portions being arranged to describe an arc of a circle concentric with the forward ends of the members.

In testimony whereof I affix my signature.

BERTIE J. LONG.